No. 888,572. PATENTED MAY 26, 1908.
M. H. AVRAM.
WEIGHING APPARATUS.
APPLICATION FILED JULY 18, 1907.
2 SHEETS—SHEET 1.
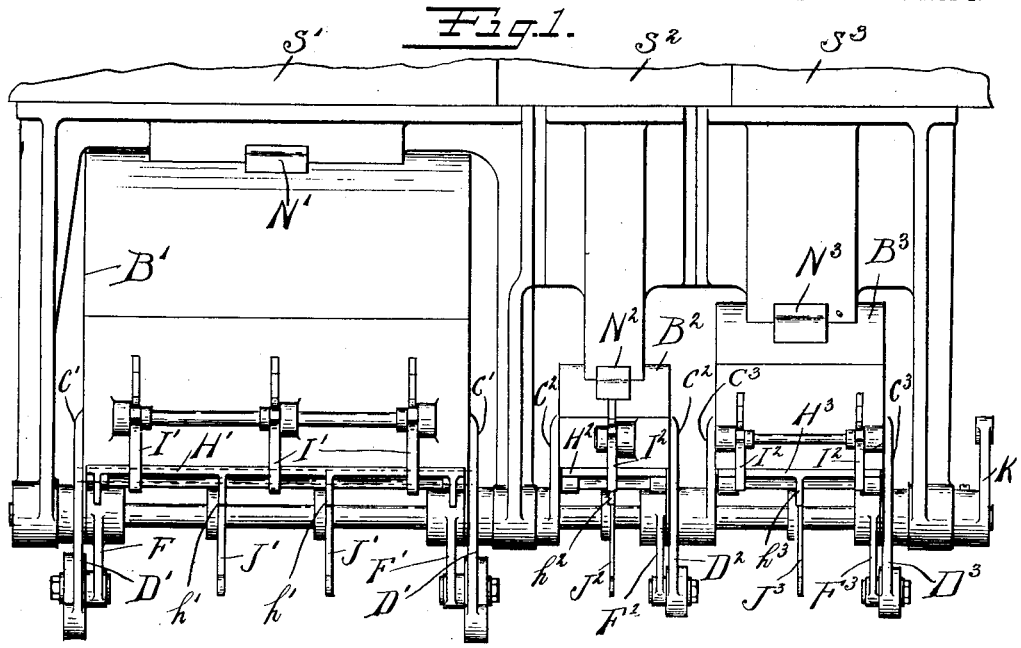
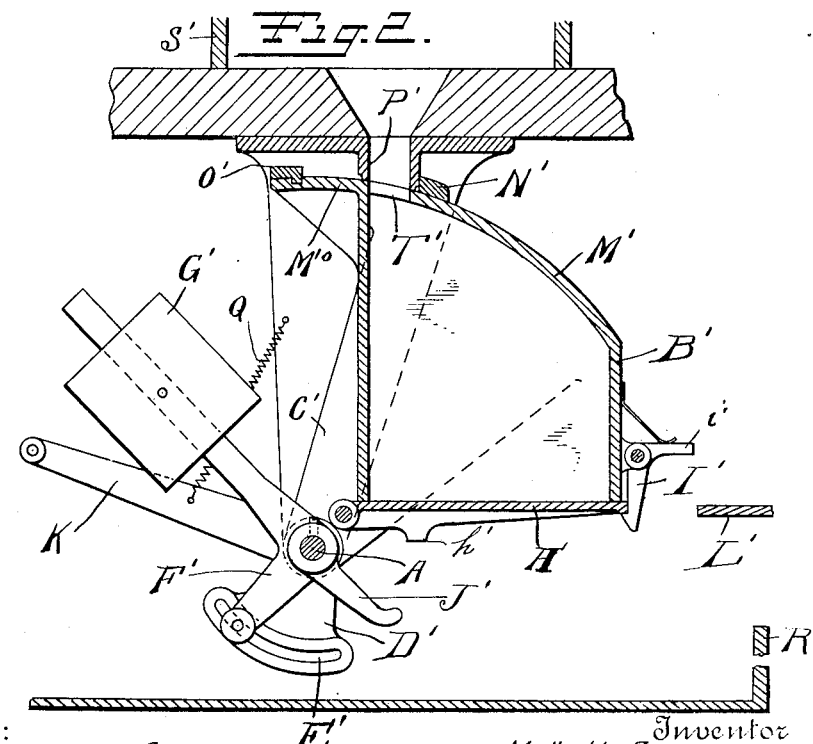
Witnesses:
Chas. A. Beard
Lillian S. James
Inventor
Moïs H. Avram
By his Attorneys
Bartlett, Brownell & Mitchell

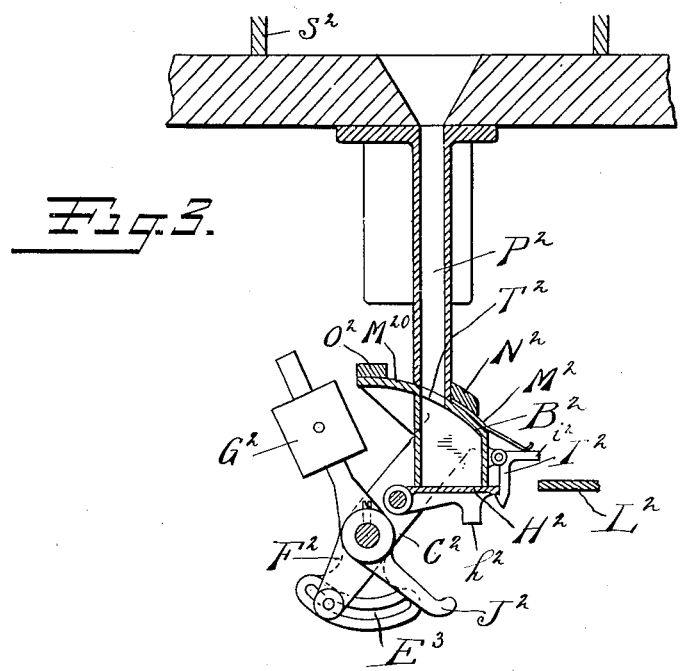
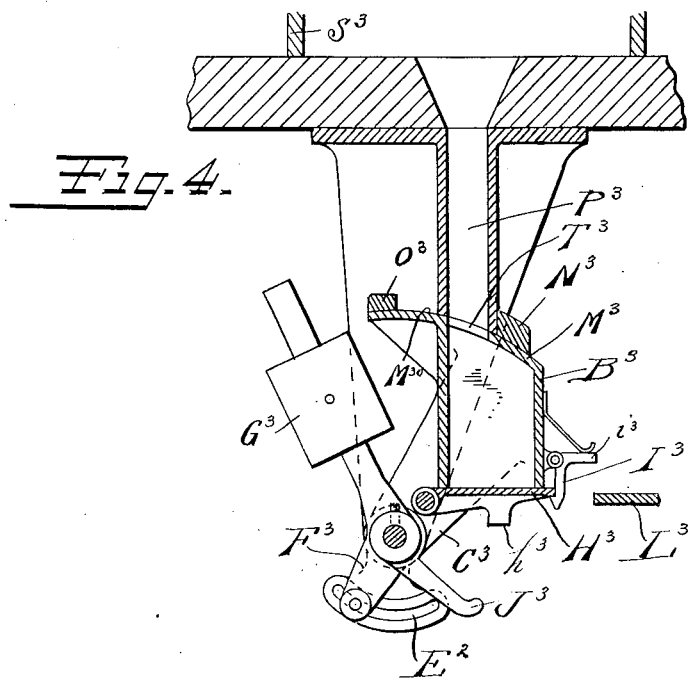

UNITED STATES PATENT OFFICE.

MOÏS H. AVRAM, OF NEW YORK, N. Y., ASSIGNOR TO AVRAM-LEET ENGINEERING COMPANY, OF NEW YORK, N. Y., A CORPORATION OF NEW YORK.

WEIGHING APPARATUS.

No. 888,572.   Specification of Letters Patent.   Patented May 26, 1908.

Application filed July 18, 1907. Serial No. 384,344.

*To all whom it may concern:*

Be it known that I, MOÏS H. AVRAM, a citizen of the United States, residing at New York, county of New York, State of New York, have invented certain new and useful Improvements in Weighing Apparatus, of which the following is a full, clear, and exact description.

My invention relates to improvements in weighing apparatus and has for its object to produce a novel and simple apparatus for weighing and delivering substances in a finely divided form and is particularly adapted for weighing such substances in powdered form. It further has for its object to produce an apparatus for weighing different kinds of such substances and discharging them into a common receptacle in which they may be mixed together.

The following is a description of an embodiment of my invention, reference being had to the accompanying drawings, in which Figure 1 represents a side elevation showing three weighing devices; Fig. 2 is a cross section through one of said devices showing the resetting lever; Fig. 3 is a cross section through another of said weighing devices of a different size; and Fig. 4 is a cross section through a third weighing device of a still different size.

Referring more particularly to the drawings, A is a shaft common to all of said weighing devices.

$B'$ $B^2$ $B^3$ are three weighing receptacles having respectively projections $C'$ $C^2$ $C^3$, which are loosely journaled upon the shaft A so as to have a movement about its axis. These extensions have projections $D'$ $D^2$ $D^3$ which are provided with slots $E'$ $E^2$ $E^3$ through which pass pins carried by bell crank levers $F'$ $F^2$ $F^3$, said pins provided with set nuts so that the position of the bell cranks relatively to the projections $D'$ $D^2$ $D^3$ can be varied. The bell cranks are also loosely mounted on the shaft A and have secured to their upper ends adjustable weights $G'$ $G^2$ $G^3$. To the extensions $C'$ $C^2$ $C^3$ are pivoted hinged bottoms $H'$ $H^2$ $H^3$, which, when in elevated position, are held by the latches $I'$ $I^2$ $I^3$ and close the receptacles $B'$ $B^2$ $B^3$. Rigidly mounted upon the shaft A are arms $J'$ $J^2$ $J^3$, which, when the bottoms are depressed and the shaft is rotated by the lever K, also rigidly mounted on the shaft A, engage projections $h'$ $h^2$ $h^3$ on the bottoms and raise the bottoms until they are engaged by the latches. Abutments $L'$ $L^2$ $L^3$ are provided, which, when the receptacles are depressed, engage with extensions $i'$ $i^2$ $i^3$ and withdraw the latches from the bottoms $H'$ $H^2$ $H^3$ so as to permit them to fall and discharge the contents of their respective receptacles. The receptacles are provided with tops $M'$ $M^2$ $M^3$ having extensions $M^{10}$ $M^{20}$ $M^{30}$. The tops are provided with back stops $N'$ $N^2$ $N^3$ and with forward stops $O'$ $O^2$ $O^3$ which engage the front and back sides of chutes $P'$ $P^2$ $P^3$ to which the materials to be weighed are supplied. The surfaces between the stops are concentric with the axis of the shaft A and are provided with openings $T'$ $T^2$ $T^3$ which, when the weighing receptacles are in elevated position, register with the chutes $P'$ $P^2$ $P^3$ respectively. The extensions between these openings and the back stops $O'$ $O^2$ $O^3$, when the weighing receptacles are in depressed position, close the chutes. The shaft and lever K, when released, are retracted by the spring Q.

R is a mixing receptacle into which the several weighing receptacles discharge.

$S'$ $S^2$ $S^3$ are bins containing the separate materials to be weighed.

The operation of these devices is as follows: When the weighing receptacles have discharged their contents, they are in depressed condition, and the hinged bottoms $H'$ $H^2$ $H^3$ are released by their detents or latches and are therefore open. Upon the depression of the lever K the shaft A, together with the levers $J'$ $J^2$ $J^3$, are revolved. The levers $J'$ $J^2$ $J^3$ engage with the projections $h'$ $h^2$ $h^3$ and force the bottoms up into engagement with their respective latches $I'$ $I^2$ $I^3$. A further movement of the lever K moves the several receptacles upward until the openings $T'$ $T^2$ $T^3$ register with the chutes $P'$ $P^2$ $P^3$. When the lever K is released, the several receptacles with their bottoms thus closed, are held in this position by their respective counter-weights $G'$ $G^2$ $G^3$. The materials to be weighed thereupon flow from their respective bins to the respective weighing receptacles and the flow continues until the weight of the material to be weighed in the receptacles overcomes the counter-balance of the respective weights $G'$ $G^2$ $G^3$. When the counter-balance of the several receptacles is thus overcome, the receptacles revolve about the shaft A until the openings $T'$ $T^2$ $T^3$ no longer register with the chute and until the latches I' I² I³ hit their respective abutments. The bottoms H' H² H³ are thereupon released and the contents falls from the weighing receptacles into the common mixing receptacle R. When all the weighing receptacles have been filled and discharged their contents, they are all three simultaneously set for another operation by a downward movement of the lever K. It is to be noted that the weighing receptacles are all set simultaneously and discharge independently, that is, the time when the receptacle B' overcomes its counter-balance G' is independent of the time when the weighing receptacle B² or B³ overcomes its counter-balance. Each of the several receptacles cuts off its supply and is discharged as soon as the proper amount of material has entered it and the amount of material which is necessary to overcome the counter-balance is determined by the position of the pins in the slots E' E² E³ or the distance of the counter-weights G' G² G³ from the center of the shaft A. The mixer is any suitable form.

My invention permits of various modifications but the embodiment above described is the one preferred by me.

What I claim is:

1. The combination of a supply chute whose discharge end is concentric with an axis, and a receptacle mounted to revolve about said axis and having a surface adjacent to the discharge end of said chute and concentric with said axis and also an opening through a portion of said surface registering with the discharge end of said chute when the receptacle is in elevated position with a lever rigidly connected to said receptacle and an adjustable counterweight on said lever.

2. The combination of a supply chute whose discharge end is concentric with an axis, a receptacle mounted to revolve about said axis and having a surface adjacent to the discharge end of said chute, and concentric with said axis and also an opening through a portion of said surface registering with the discharge end of said chute when the receptacle is in elevated position, said receptacle having a bottom hinged thereto, a latch for holding the same closed, and an abutment located in the path of said latch so as to be engaged by the same on the downward movement of said receptacle.

3. The combination of a supply chute whose discharge end is concentric with an axis, a receptacle mounted to revolve about said axis and having a surface adjacent to the discharge end of said chute, and concentric with said axis and also an opening through a portion of said surface registering with the discharge end of said chute when the receptacle is in elevated position, said receptacle having a bottom hinged thereto, a latch for holding the same closed, an abutment located in the path of said latch so as to be engaged by the same on the downward movement of said receptacle, and a lever revoluble around said axis and adapted to engage said bottom and force it into engagement with said latch and to return said receptacle to elevated position.

4. The combination of a supply chute whose discharge end is concentric with an axis, a receptacle mounted to revolve about said axis and having a surface adjacent to the discharge end of said chute and concentric with said axis and also an opening through a portion of said surface registering with the discharge end of said chute when the receptacle is in elevated position, said receptacle having a bottom hinged thereto, a latch for holding the same closed, an abutment located in the path of said latch so as to be engaged by the same on the downward movement of said receptacle, and an adjustable counter-weight for said receptacle.

5. The combination of a shaft, a plurality of counter-balanced receptacles journaled thereon and free to move relatively thereto, means for automatically opening each of said receptacles when its counter-balance is overcome, and a common means for closing all of said receptacles and restoring them to receiving position.

6. The combination of a plurality of counter-balanced receptacles movable about a common axis, so as to be free to move relatively thereto, said receptacles having pivoted bottoms and latches to hold said bottoms closed, abutments for engaging said latches and releasing said bottoms when said receptacles are depressed, and a common means for bringing said bottoms into engagement with said latches and restoring said receptacles to receiving position.

7. The combination of a supply chute whose discharge end is concentric with an axis, a receptacle mounted to revolve about said axis and having a surface adjacent to the discharge end of said chute and concentric with said axis and also an opening through a portion of said surface registering with the discharge end of said chute when the receptacle is in elevated position, said receptacle having a bottom hinged thereto, a latch for holding the same closed, and an abutment located in the path of said latch so as to be engaged by the same on the downward movement of said receptacle, and stops for limiting the movements of said receptacles.

MOÏS H. AVRAM.

Witnesses:
COLLINS P. BLISS,
J. W. PERRY.